W. A. IVES.
Auger-Handle.
No. 205,096. Patented June 18, 1878.
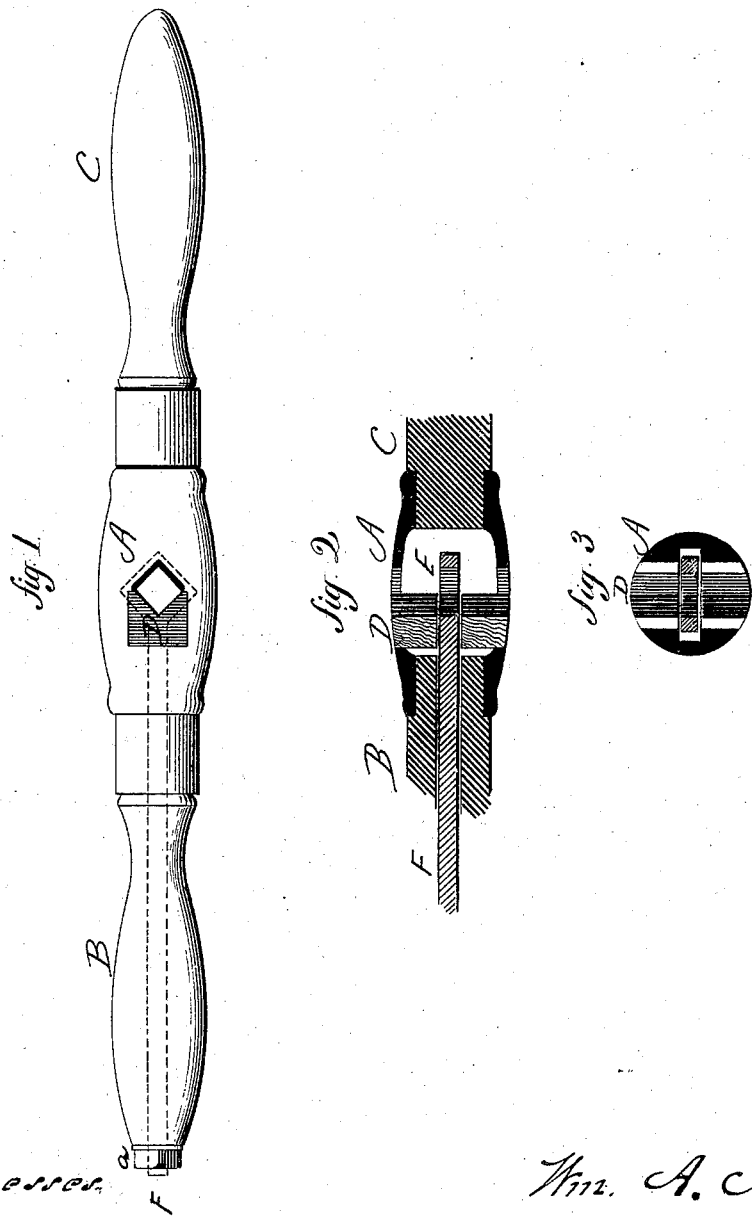

UNITED STATES PATENT OFFICE.

WILLIAM A. IVES, OF NEW HAVEN, CONNECTICUT.

IMPROVEMENT IN AUGER-HANDLES.

Specification forming part of Letters Patent No. 205,096, dated June 18, 1878; application filed April 30, 1878.

*To all whom it may concern:*

Be it known that I, WM. A. IVES, of New Haven, in the county of New Haven and State of Connecticut, have invented a new Improvement in Tool-Handles; and I do hereby declare the following, when taken in connection with the accompanying drawings and the letters of reference marked thereon, to be a full, clear, and exact description of the same, and which said drawings constitute part of this specification, and represent, in—

Figure 1, a top view; Fig. 2, a longitudinal section; and in Fig. 3, a transverse section.

This invention relates to an improvement in the construction of auger-handles, and particularly to the method of securing the auger in the handle.

Various devices have been made for this purpose, and among them a metal head or socket, through which the tang of the auger may be introduced, and a clamp movable longitudinally in the socket, so that bearing upon one side of the tang would clamp the opposite side into the socket. This connection brings metal to metal, and depends entirely upon the friction between such metal and metal as the means for holding the auger. Generally this is not sufficient to enable the workman to draw the auger without turning backward.

The object of this invention is to construct a clamp which will securely hold the auger, so that it may be withdrawn without turning backward; and it consists in combining with a metal socket a seat of wood, or material other than metal, to form a seat, against which the clamping device will force the tang of the auger, and as more fully hereinafter described.

A is the socket, constructed of metal, and so as to receive the wood ends B C. Vertically through the socket a seat, D, consisting of a block of wood, or of a material of a softer or more flexible nature than metal, is introduced and securely fixed in the socket. One edge of this is V-shaped, as shown. E is the clamp, which consists in a corresponding V-shaped recess in a bar, F, extending longitudinally through one of the handles B, and with a nut, a, at the end, or other means to draw the clamp E toward the seat D.

The clamp E is loosened, so as to allow the tang of the auger to be passed in between it and the seat D, and when so passed in the nut or tightening device a is applied so as to draw the clamp E toward the seat D, and bind the tang of the auger firmly against the seat.

This wood, or, as it may be termed, "semi-flexible" seat produces a very great friction upon the auger, and so great that no ordinary strain can force the handle from the auger, whereas a metal seat or bearing under the same force would easily slip from the tang.

I am aware that auger-handles have been made with a clamping device working axially through the handle to bear upon one side of the shank of the auger, to force it against a bearing upon the opposite side, and therefore do not broadly claim such a device, my invention being an improvement upon such handles.

What is claimed as new, and desired to be secured by Letters Patent, is—

The socket A, provided with a seat, D, of wood or similar material other than metal, combined with the longitudinal clamp E, substantially as specified.

WILLIAM A. IVES.

Witnesses:
JOHN E. EARLE,
H. A. KITSON.